United States Patent
Long et al.

(10) Patent No.: US 7,279,660 B2
(45) Date of Patent: Oct. 9, 2007

(54) APPARATUS FOR BREWING BEVERAGES

(75) Inventors: Tom Long, Hockessin, DE (US);
Daniel D. Friel, Sr., Greenville, DE (US); Daniel D. Friel, Jr., Kennett Square, PA (US); James M. Fitzgerald, West Chester, PA (US); H. William Busch, Jr., Wilmington, DE (US)

(73) Assignee: Edgecraft Corporation, Avondale, PA (US)

( * ) Notice: Subject to any disclaimer, the term of this patent is extended or adjusted under 35 U.S.C. 154(b) by 340 days.

(21) Appl. No.: 10/774,329

(22) Filed: Feb. 5, 2004

(65) Prior Publication Data

US 2006/0124628 A1 Jun. 15, 2006

Related U.S. Application Data

(60) Provisional application No. 60/445,370, filed on Feb. 6, 2003.

(51) Int. Cl.
*F27D 11/00* (2006.01)
*A47J 31/00* (2006.01)

(52) U.S. Cl. .................. 219/441; 219/438; 219/519; 219/523; 219/507; 219/490; 219/492; 219/487; 219/495; 99/283; 99/319; 99/318; 99/297; 99/282; 99/299; 99/295

(58) Field of Classification Search ............. 219/444.1, 219/490–492, 494, 487, 495, 507, 523, 519, 219/438; 99/319, 318, 297, 295, 299, 283, 99/282
See application file for complete search history.

(56) References Cited

U.S. PATENT DOCUMENTS

| | | | |
|---|---|---|---|
| 3,279,351 A | * | 10/1966 | Cohn ........................ 99/282 |
| 4,401,014 A | | 8/1983 | McGrail |
| 4,544,830 A | | 10/1985 | Miller |
| 5,862,738 A | | 1/1999 | Warne |
| 6,135,010 A | * | 10/2000 | Husted et al. ............... 99/319 |
| 6,240,833 B1 | | 6/2001 | Sham et al. |

FOREIGN PATENT DOCUMENTS

| | | |
|---|---|---|
| DE | 197 06 523 | 8/1998 |
| WO | WO 00/40128 | 7/2000 |

* cited by examiner

*Primary Examiner*—Shawntina Fuqua
(74) *Attorney, Agent, or Firm*—Connolly Bove Lodge & Hutz

(57) ABSTRACT

An electrically heated water kettle comprises a vessel for holding a liquid for extraction of tea, coffee or other food material. The vessel includes a partially open immersible container sized to allow the passage of water between the walls of the vessel. The container is capable of holding the material while an opening in the container allows the entrance of water into the container upon immersion of the container in the water. The heated kettle incorporates structure to hold the container out of the water until the water reaches an appropriate extraction temperature and to immerse or withdraw the container into or from the water as is necessary to accomplish the extraction.

14 Claims, 6 Drawing Sheets

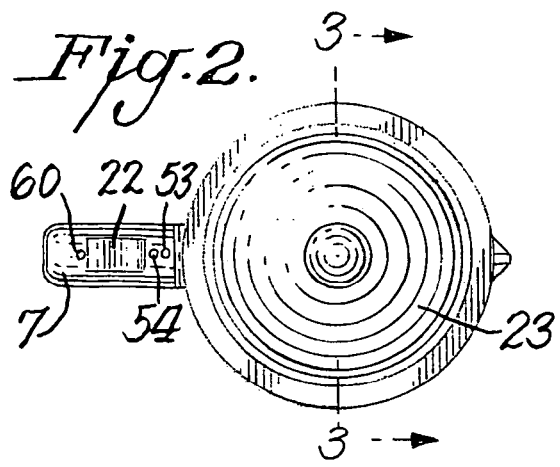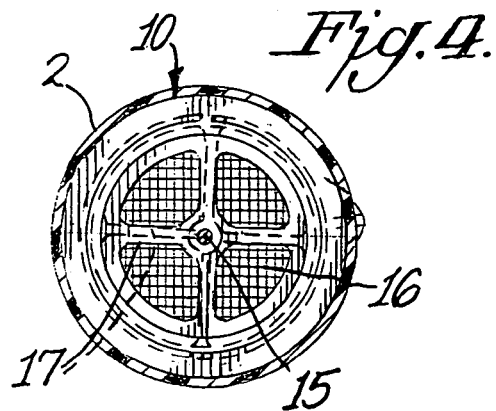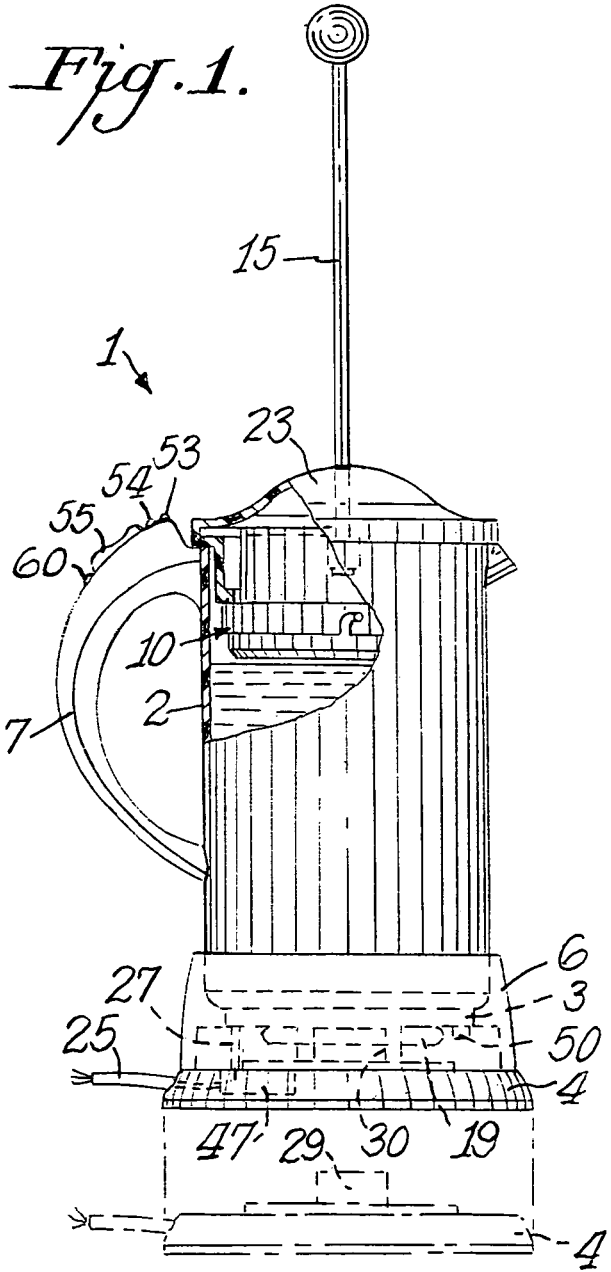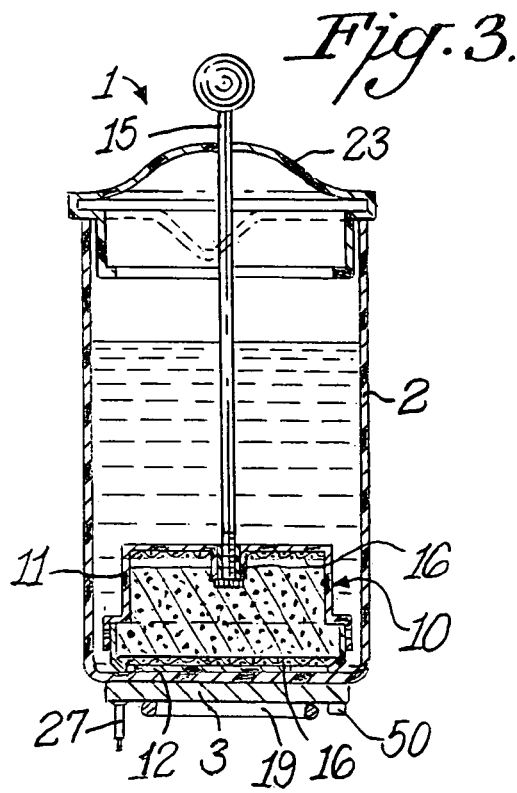

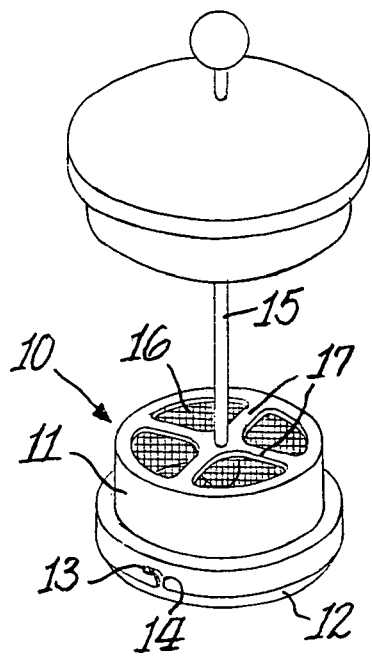
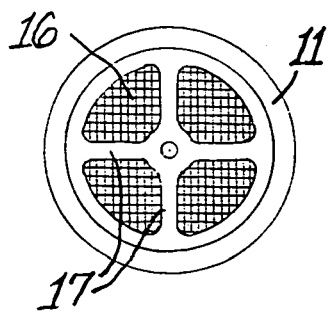
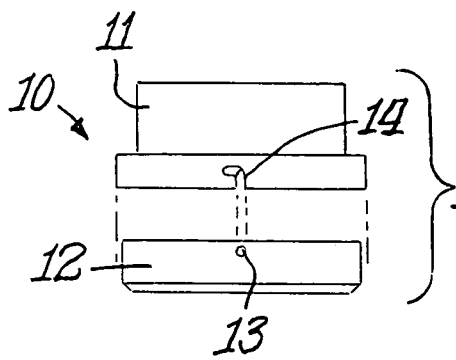
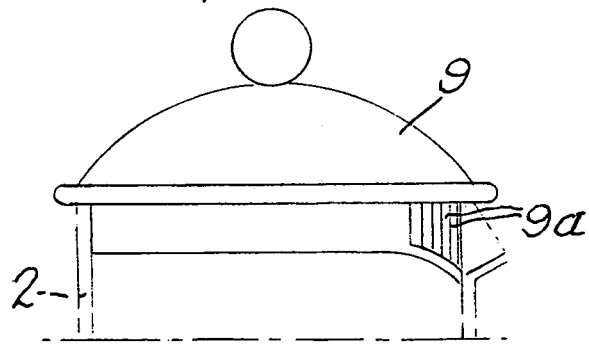
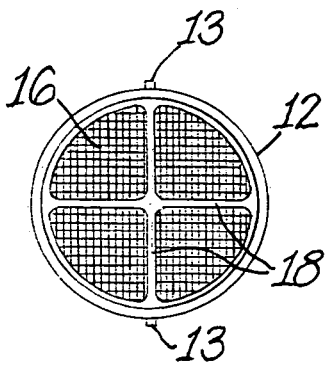
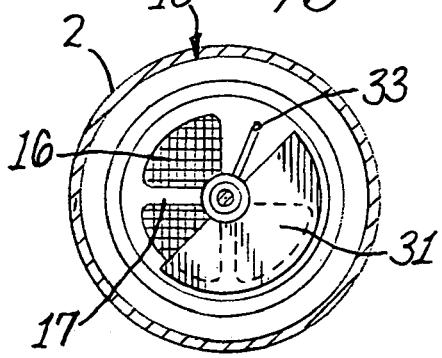

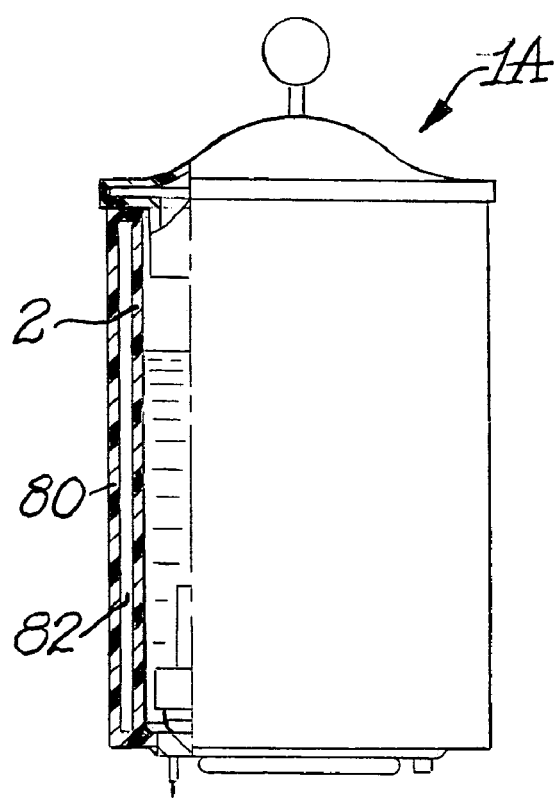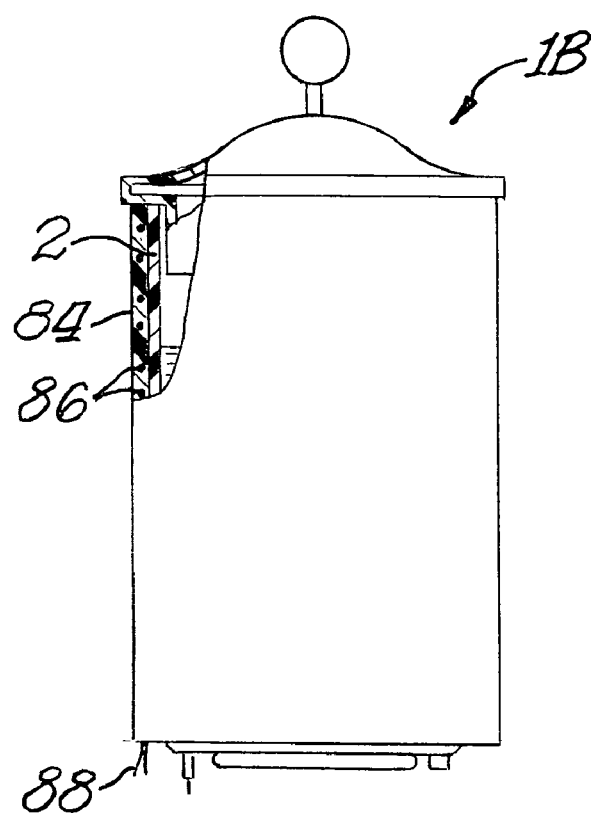

APPARATUS FOR BREWING BEVERAGES

CROSS-REFERENCE TO RELATED APPLICATION

This application is based on provisional application Ser. No. 60/445,370, filed Feb. 6, 2003.

BACKGROUND OF THE INVENTION

A wide range of means have been disclosed for the brewing of tea and coffee including percolators, drip methods, and french press. The french press is among the most effective means for extracting the best flavors from tea leaves and ground coffee. The most common french presses are non electric and depend upon preheating the water by conventional means and transferring the hot water to a french press for extraction of the tea leaves or coffee. The electric french press is a similar means to prepare such beverages that boils the water directly in the kettle to insure that the water is at boiling temperature at the start of the brewing cycle.

A conventional electric french press type kettle such as described in PCT WO 00/40128 and (PCT/EP99/10357) (DE 19706523A1) is a glass or plastic water vessel with an electric heater plate which is in contact with the water. In such prior art, electrical connection to the kettle and the heater is commonly made through a detachable supporting base that contains an electrical connector which inserts into an electrical socket on the underside of the base enclosure of the kettle. It is common also for the kettle to have a handle on which there is a steam actuated electrical switch that will interrupt all power to the heater plate whenever the water boils and generates steam. However, these conventional brewing devices lack versatility, lack sufficiently precise control of the water temperature during the actual brewing process and have other limitations found to be objectionable by the serious consumer of these beverages.

SUMMARY OF THE INVENTION

This invention is an advanced electric brewing kettle that provides means for adjusting the water temperature precisely to any value for optimum extraction of a wide variety of coffees and teas. The optimum temperatures for extracting green teas is much lower than the black teas. Coffees are generally best extracted at a particular temperature just below the boiling point of water, selected for a favorite coffee and personal tastes. The improved apparatus described here is designed so that the user can operate it either similarly to a French press or as an improved extractor that allows the coffee, tea or other extractable food to be preheated and steamed before the liquid extraction takes place.

This invention incorporates an improved means of containing the tea leaves or ground coffee during the extraction and steeping process. By this novel means the contained tea or coffee can be immersed in the water exactly at the optimum brewing temperature and can be removed completely from the water after the precisely optimum steeping or brewing time, thereby stopping abruptly any further extraction. By stopping extraction the more bitter ingredients in the tea leaves or coffee grounds are not extracted and mixed with the more flavorful flavorants already extracted into the water. Further the opportunity for any of the fine grinds from the coffee or tea to remain in the extracted tea or coffee is virtually eliminated—unlike the situation with french presses where the extracted fragments of the tea or coffee remain in the kettle as the beverage is poured. These conventional means aversely affect taste of the beverage and allows unfiltered solids to be poured with the liquid.

An added advantage provided by this novel means is that the ground coffee or tea leaves confined within a semi-open container can remain in the kettle above the water level during the time that the water is being heated—thereby allowing the steam to penetrate and swell the tea leaves or ground coffee before they are immersed in the water for extraction. This swelling process or "blooming" allows the extraction time during immersions to be more efficient and shortens the extraction time.

Unique, electrical and electric means provide ability to precisely control the extraction time and the extraction temperature, and to adjust operating procedures to adapt to changes in the boiling point due to localized atmospheric pressure especially at higher elevations.

THE DRAWINGS

FIG. 1 is a side elevational view partially broken away of an apparatus for brewing beverages in accordance with this invention;

FIG. 2 is a top plan view of the apparatus shown in FIG. 1;

FIG. 3 is a cross-sectional view taken through FIG. 1 along the line 3-3;

FIG. 4 is a cross-sectional top plan view of a beverage container used in the apparatus of FIGS. 1-3;

FIG. 5 is a perspective view of the container system used in the apparatus of FIGS. 1-4;

FIG. 6 is a top plan view of the upper cover section of the apparatus shown in FIGS. 1-5;

FIG. 7 is a bottom plan view of the lower basket section using the apparatus of FIGS. 1-5;

FIG. 8 is an exploded side elevational view showing the upper cover section for the lower basket section of the apparatus shown in FIGS. 1-5;

FIG. 9 is a cross-sectional plan view of a portion of the apparatus shown in FIGS. 1-5;

FIG. 14 is a side elevational view of a cover used in the apparatus shown in FIGS. 1-5; and FIGS. 15-16 are side elevational views partly in section of further embodiments of this invention.

DETAILED DESCRIPTION

Figure 10:
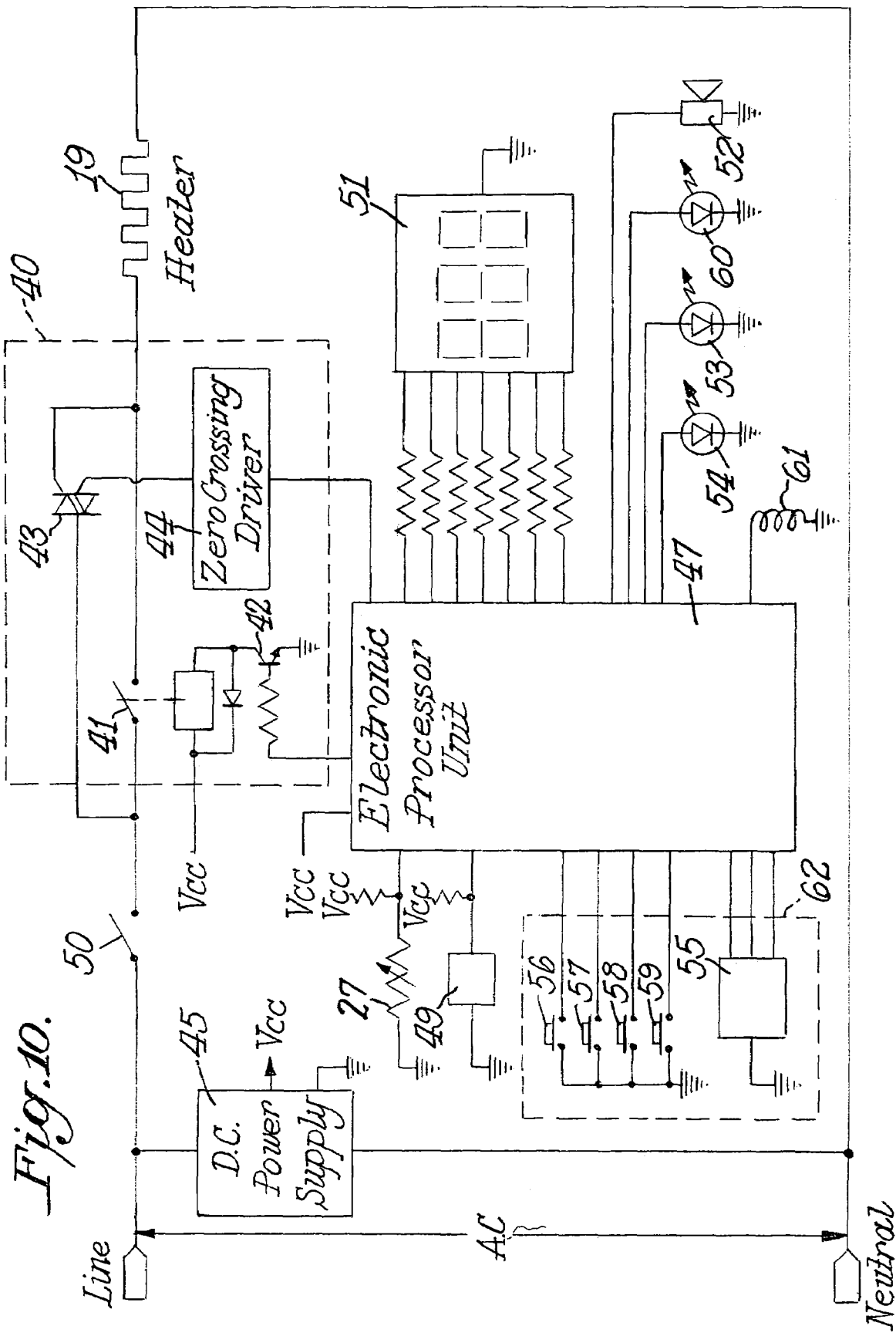
FIG. 10 is a circuit diagram for the apparatus shown in FIGS. 1-5.
Figure 11:
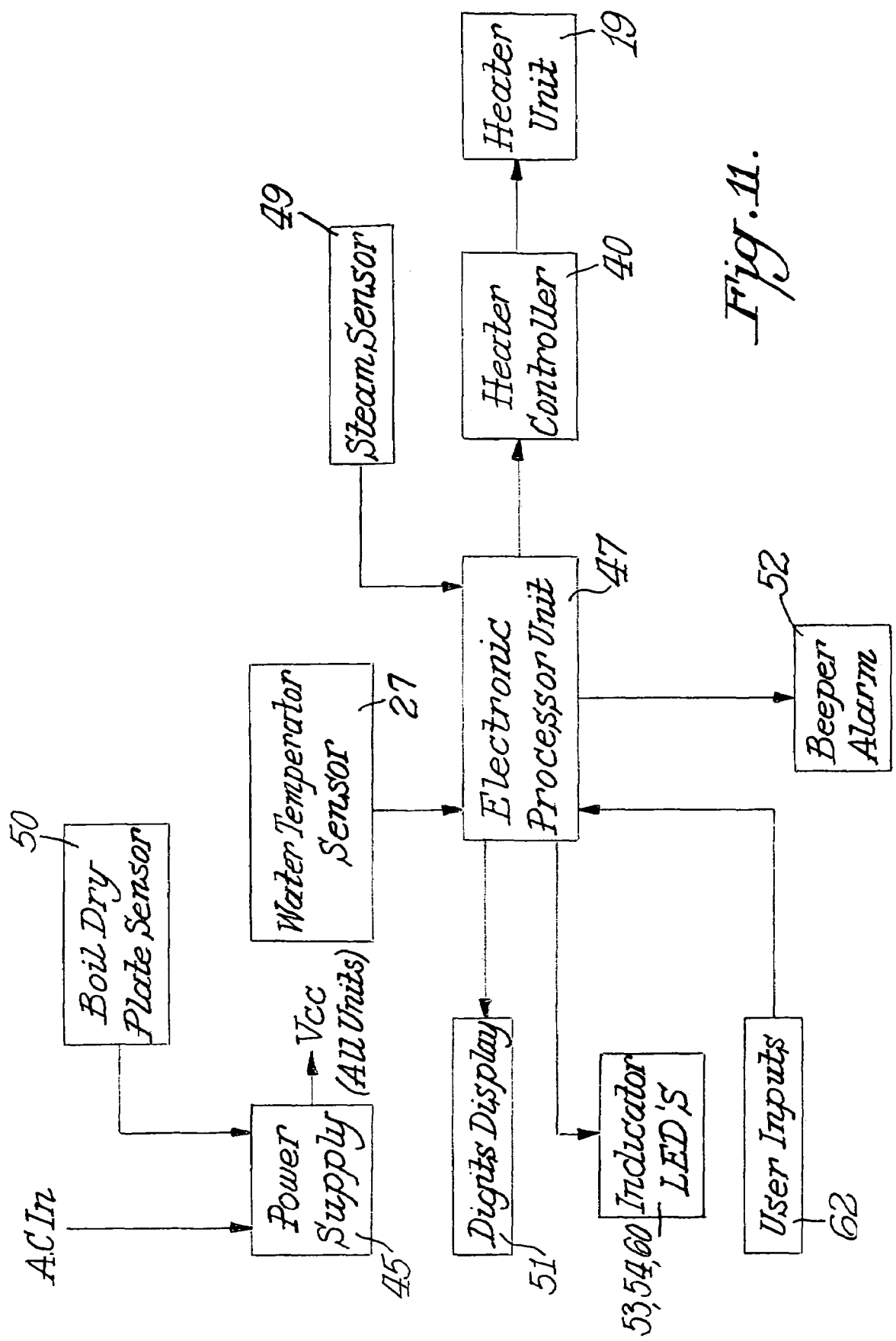
FIG. 11 is a block diagram showing the relationship of the various components of the apparatus shown in FIGS. 1-5.

An improvement of this invention is a unique container system which can hold ground coffee or tea leaves within the kettle but out of the water until it is heated to the optimum temperature. FIG. 1 shows an electrically heated kettle 1 with a glass or plastic shell vessel 2, a handle 7 with one or more control switches 55 and LEDs 53,54 and 60 mounted on the handle. The unique container system 10 is supported above the liquid on the lower end of control rod 15 which passes thru the kettle cover 23. The container can be lowered manually or in alternative models by an automated means beneath the surface of the water in the kettle during the extraction cycle. An electric heater plate 3 is attached to the bottom of the kettle shell 2. Preferably the heater plate 3 forms the bottom of the kettle being sealed to the kettle in a manner that insures that one side of plate 3 is in direct contact with the water. Attached to the bottom of the heater plate 3 is an electrically powered heater 19. Power applied to this heater is controlled by a uniquely programmed electronic processor and controller. Temperature of the water is measured by a thermocouple, thermistor 27 or similar temperature sensor that plugs into processor 47 mounted in enclosure 6. The temperature sensor 27 is mounted either in direct contact with the heated water, the kettle shell or under the lower heater plate 3 which in turn remains in intimate contact with the heated water. The entire apparatus is powered thru power cord 25 connected through base 4 in which is mounted a cordless connector of a type similar to that commercially available from Otter, Strix and other suppliers. Power to the kettle itself is passed through this connector by a plug 29 extending from the base 4 that goes into socket 30 attached to the base of the heater plate 3 in the enclosure 6 which supports the kettle and serves to enclose certain electrical components mounted under the kettle and the heater plate 3. While a cordless kettle is generally preferred, the kettle can be connected directly by means of a power cord to the local household power outlets.

The filled food container 10 can be immersed in the heated water at the beginning of the extraction process and held there for the extraction cycle. At that time the container 10 can be raised above the heated liquid in order to abruptly terminate the extraction process. The container while in the water can be held in one position or if desired it can be moved up and down manually or mechanically in order to enhance the flow of water through the container providing better contact with the tea leaves or ground coffee in order to enhance the extraction efficiency or to achieve a different type of extraction and taste balance.

Container system 10 (FIG. 3) consists of an upper section 11 (FIGS. 5 and 8) to which is attached a lower basket section 12 that holds the tea leaves or ground coffee. The lower basket section 12 is attached to the upper section 11 by aligning the pins on the lower basket 12 to the slots in the upper section 11, inserting the basket 12 into the upper section and rotating the lower section 12 to secure its position. The lower section 12 can be removed from the upper section 11 even while upper section 11 remains attached to rod 15.

Rod 15 (FIGS. 1, 3 and 5) attaches securely to the upper section 11 of the container system 10 to permit raising and lowering the container system within the kettle. The container system 10 is designed with a diameter or outer dimension smaller than the internal diameter or dimension of kettle 2 so that the container system can be moved freely up and down and the water or steam is free to flow around the system as it is moved up or down or as the final tea or coffee is poured out of the kettle. Water also can enter or flow through the container which is enclosed for example with a screen-like structure attached to the supporting arms 17 (FIGS. 5 and 6) and supporting arms 18 of FIG. 7 on the upper and lower ends of the container system respectively. Openings in the screens can be adjustable or in any event the individual openings are sufficiently small to contain the tea leaves and coffee grounds yet large enough to allow water to move into and out of the container system. Because the container physically isolates the coffee or tea being extracted, the extracted solid residue held within container system 10 is readily removed from the kettle 2 thus leaving the kettle relatively clean and hence requiring little to no effort to clean it. Multiple brew cycles are possible without cleaning the kettle.

Once the tea or coffee is brewed the container assembly 10 can remain in the water but preferably it will be raised above the water level to stop the extraction. It can of course be removed completely from the kettle and if one wishes a pouring lid 9, (FIG. 14) can be placed on the kettle 2 before the tea or coffee is poured out of the kettle. Slots 9a in the lid allow the lid to be tight fitting yet the beverage can be easily poured out of the kettle with the lid in place.

Critical to producing beverages of optimum flavor is the temperature at which the flavors are extracted and the time of contact with the liquid during extraction. Coffees and teas contain a wide range of organic flavorants. Some of the flavorants are very aromatic, some less. Some components add a bitter taste and are generally to be avoided. The amount of these various flavorants extracted depends on the exact temperature of the water. As the water temperature increases the solubility of each component will change and the rate of extraction increases with temperature. Further the rate of extraction of any component varies with the concentration of that component already in solution. Clearly as the extraction time is increased the concentration of the individual flavorants generally continues, but importantly the ratio of key flavorants is altered sufficiently to be perceptible to anyone with sensitive taste. Consequently the ultimate ratio of flavorants depends on time, temperature, amount of tea or coffee, degree of confinement of the liquid around the tea or coffee and the liquid agitation within the brewing environment. All of these factors must be carefully controlled and clearly if the brewing environment and apparatus allows these variables to be changed by the user, the user will be able to optimize conditions to tailor his beverage to his own taste.

The advanced brewing means disclosed here has the necessary versatility to allow the user to modify the brewing conditions to best match each type of tea or brand of coffee. Thus this novel appliance permits individual but precise control of the brewing temperature and brewing time, while providing the means for preconditioning of the tea of coffee before brewing, and control over agitation during the brewing process.

The coffee or tea is placed in a semi-enclosed container whose exterior enclosing surfaces contain a number of small openings to allow water or steam to enter the container during the blooming and during the extraction periods. Commonly a screening type material is used to provide for liquid transfer in and out of the container. The individual openings however are sufficiently small to prevent the ground coffee particles or tea leaves and fragments from passing thru the openings. The number of such openings and the total open area on the surface are important to control the degree of flow or diffusion of liquid and steam into and out of the enclosure. If the open area is large the extraction will result in a flavorant mixture that approaches that obtained by simply pouring the coffee or tea into the heated water. If the total area open for flow of water or steam is small, the conditions and flavor will approach that of a samovar where the tea is confined in only a small volume of water as the extraction occurs. Provision can be made to allow for adjustment of the number of openings or the area of screen in use at any one time. That adjustment can be easily obtained for example by using adjustable close fitting shutters 31 adjacent to the screened area as in FIG. 9, adjusted by a manual means such as lever 33. The degree of adjustment of the open screened area shown in FIG. 9 ranges approximately from 25% to 75% open area. It is more convenient in some models to provide a range of 0 to 100%.

The design of this advanced brewing means offers the user a choice among a variety of alternative brewing processes. First it is possible to use this in a way similar to a conventional french press which allows him to drop the coffee or tea directly into the heated water, to allow the extraction process to take place around individual particles of coffee or tea leaves surrounded with the large volume of water. The particles drift downward as they wet, then tend to accumulate at the bottom of the kettle and after extraction are mechanically confined by pressing down a screen-like filter tightly conforming to the walls of the chamber to confine the particles at the bottom of the press. They remain there subsequently as the tea or coffee is poured and consumed. Leaving the coffee or tea in the press as the beverage is consumed permits continued extraction of some of the more bitter flavorants—adversely affecting the flavor of the beverage. While some users may enjoy the increasingly stronger beverage as the extraction continues over such extended periods, most experts find this detrimental to the flavor or taste. An important improvement, however of the versatile new product disclosed here allows the user to first steam or moisten the coffee or tea which allows the particles to soften and swell (bloom) increasing their total surface area and facilitating better control of the extraction conditions. This new product also permits one to use the novel container, immerse it without agitation at the precisely optimum temperature for an optimum time and to then withdraw it completely from the heated vessel before pouring the beverage. In the other extreme the user can move the container up and down within the water or into and out of the water to obtain maximum extraction of all flavorants in the shortest possible time.

Consequently this novel means provides a variety of reproducible and controlled brewing options allowing the user to optimize the flavor of his coffee, tea or other extractable material to suit his individual preferences.

In order to provide this extreme brewing flexibility this novel apparatus employs, advanced means for controlling the temperature and time with high accuracy, means for compensating for changes in boiling point due to changes in atmospheric pressure, means for keeping the beverage warm after brewing is complete and means in advanced models to automatically initiate the brewing process. These advantages will be clear as the operation of this new product is further described.

Because it may be desired to use this electric kettle simply to boil water for preparation of hot chocolate, soups, etc., protection must be built in to prevent continuous boiling with the possibility of boiling the kettle dry and overheating the unit creating a hazardous situation. Provision is provided in this advanced system to avoid such a possibility while at the same time giving the user the option of setting the water temperature just below boiling such as 211° F. when the actual boiling point at sea level is 212° F. To control the absolute temperature with an accuracy of less than 1° F. is possible but very costly and perhaps impractical for a home appliance. Consequently a novel electronic processor is used to monitor an electronic signal from an incorporated thermal detector in this product to detect the presence of boiling regardless of the temperature at which the water boils depending on the local barometric pressure. The electronic processor simultaneously monitors with aid of a temperature sensor the temperature of the water or of the steam/air mixture just above the water and if the water does boil, the processor retains the precise temperature measurement and notes that as the local boiling point. Subsequently the processor advises the user that he must manually set his desired temperature below that boiling temperature, limits the users ability to set his desired temperature at or above the boiling point, or otherwise prevents this apparatus from continuing to heat the water beyond its local boiling temperature.

This brewing apparatus provides a means for the user to set his desired brewing temperature with great accuracy. For green tea this may even below 150 degrees Fahrenheit while for black tea or coffee he may wish to set the temperature at or just below the boiling point. Other teas and coffees fall generally within this range of temperatures. It is important therefore to sense the water temperature accurately and to display the temperature setting accurately by means of either or mechanical or electrical means. Perhaps the most convenient and accurate means of sensing the water temperature electronically is with either a thermocouple precision thermistor or other means in excellent thermal contact with the water or contacting a highly thermally conductive thin material separating the sensor from the heated water. Because of the high thermal conductivity of the metal heater plate in contact with the heating water the dry side of the heater plate provides a convenient and practical place to monitor the water temperature. That plate can alternatively be provided with a thin walled thermal well, protruding into the liquid, in which to mount a thermistor or thermocouple. Alternatively the sensor can be mounted on an internal wall of the kettle to achieve even greater thermal accuracy.

An electrical heater for the water is mounted on a metal plate, for example made of steel or aluminum, one side of which is in good thermal contact with the water in the kettle. The heater must provide a large amount of power in order to heat the water quickly but substantially less power is required to maintain the heated water and kettle once the desired temperature is reached. Consequently it is desirable to have a high wattage heater for example in the range of 1000-1500 watts to heat the water quickly. Once the water is heated to the control temperature not more than about 100 to 200 watts is needed to maintain it there. This novel brewing apparatus uses a single high wattage heater to permit rapid heat up of the water but incorporates an electronic controller that regulates the intermittent flow of electrical power applied to that same large power heater as a means of reducing the effective wattage of the large heater during the keep warm cycle. This unique means avoids the need for two heaters of different wattage, inefficient and expensive resistors, conventional relays, or mechanical thermostats. The controller thus sends short-time bursts of full power to the large heater at just the correct frequency and duration to maintain the water at precisely the desired temperature. Commonly the controller sends many pulses each second. The effective wattage required will of course be larger if there is more water in the kettle or if the water is maintained at a higher temperature than if the water is closer to room temperature.

This novel brewing apparatus also includes means to keep the beverage warm after the brewing cycle is complete. The electronic processor 47 is programmed to adjust automatically in response to the thermal sensor 27 the frequency and duration of electrical power pulses applied to the heater 19 to maintain the beverage at a preselected temperature such as 160° C. Controls are provided to enable the user to change this "keep-warm" temperature in order to provide a cooler or warmer beverage. This advanced means of varying the wattage of the heater insures that just the correct amount of energy is applied to the heater and kettle. Excessive power is never applied to the heater. Consequently and importantly unlike conventional heating means the temperature of the heater plate 3 is never heated in the "keep-warm" mode to more than a few degrees above the average temperature of the beverage in the kettle, thus avoiding overheating the beverage and adversely affecting its temperature.

It is important to minimize the amount of energy required to "keep-warm" the beverage in order to minimize any modification of the optimum flavor of the beverage. Any heating implies some differential in temperature between the heating source such as the heating plate and the liquid. To further reduce that differential temperature, it is desirable to reduce heat loss from the kettle, especially during the "keep-warm" period which may be well in excess of an hour. A convenient way to reduce such losses is to use an insulating double walled kettle 2 preferably with a good vacuum in the inner space between the double walls. Conventional thermal insulating materials can also be used around the kettle to reduce the heat loss. Another novel means is an electrically heated blanket or a circular flexible or rigid heated enclosure maintained at the "keep warm" temperature, conforming closely to the exterior of the kettle. Such warmed means that surround the large area of kettle walls require a vanishingly small temperature differential between the heated blanket and kettle to maintain the beverage at the "keep-warm" temperature.

The signal generated by the temperature sensor, proportional to the water temperature is fed to an electronic processor and the signal from a means to set the temperature level selected by the user is likewise fed to the processor. The processor compares these two signals and directs the controller to apply the appropriate amount of power to the heater to either heat the water rapidly or to apply a lessor amount of heat—just enough to maintain the temperature at the set temperature.

The processor uses modern solid state integrated chip technology to handle electronic inputs, to manipulate and compare input signals, to make the logic decisions, to convert analog signals from sensors to digital form, to make necessary calculations and to direct the controller regarding the appropriate power that must be applied to the heating elements. The controller can adjust the power to the heater either by use of electrically actuated mechanical relays, by means of solid state Triacs™, thyristors, solid state relays and can employ time based pulse width modulation methods for controlling the amount of power transferred.

This brewing device will preferably have an electronic display conveniently accessible to the user to display the set temperature (the desired brewing temperature) with manually operated control buttons that allow the user to set the temperature higher or lower. A conventional LED (light emitting diode) or LCD (liquid crystal device) can be used to display conventionally the set water brewing temperature or the same display can be directed to read-out the actual water temperature. This same display can be used also to display brewing time and to display "remaining brewing time" to indicate and advise the user as the brewing proceeds and ends. When the brewing cycle ends visual and/or audible indications or alarms can be made to advise the user that the beverage is ready for consumption.

In normal operation the user will preselect the desired brewing temperature and brewing time using the provided control buttons. The average user will not find it necessary to change either brewing time or temperature very often once he optimizes his preferred operating parameters. However, the controls are sufficiently flexible to allow the user to easily experiment and to change these parameters until the optimum is realized. Some models can memorize and store several different programs found by the user to be optimum for different teas or coffees. It is then a simple matter for the user to select stored programs depending on the special tea or coffee being brewed at a given time. The controls are sufficiently flexible to allow the user if he wishes to defeat the timing function and to control the timing by other means.

FIG. 10 is an electrical diagram of the basic operating components. Initially the processor 47 has factory set default values stored for brewing time and temperature. If the user chooses to change brewing time, the time input button 56 is pressed and the display 51 will show the time set. The user can then use the increment button 58 or decrement button 59 to change the default time setting. Similarly, the user may press the brewing temperature-input button 57 and then using the same increment 58 or decrement 59 buttons to change default temperature setting. The processor 47 will store these values for the next use. When the kettle is used again, the modified values will be loaded even if the kettle has been turned off and power removed. The multifunction switch 55 is a user input device which allows the user to select the mode for the kettle to operate. It can of course be several switches. The commonly preferred functions are, but not limited to, OFF, HEAT and BREW. When the multi-function switch 55 is actuated to the "HEAT" position, the processor 47 will activate the heater controller 40 in the following manner: first transistor 42 will be activated which in turn energizes relay 41 to apply full power to heater 19. The processor will then compare output from temperature sensor 27 with set temperature and when sensor 27 output reaches set temperature, the processor 47 will deactivate transistor 42 and relay 41 and activate triac 43 through zero crossing driver 44. This triac 43 is activated and deactivated many times each second in a time based pulse width modulation manner in order to reduce the effective wattage to the heater 19 to only that sufficient to maintain set temperature. With this novel method the minimum time is required to bring the water up to the set temperature by using, for example, full 1500-watts, then more accurate control is utilized to maintain water temperature within a tight tolerance using less wattage. The zero crossing driver 44 senses the location of the AC sine wave voltage and only activates the triac 43 when there is a zero voltage condition thereby reducing inrush current and eliminating radiated interference.

While heating in full power mode, LED 53 will be activated by processor 47. When set temperature is reached LED 54 and/or audible signal device 52 will be activated by processor 47. Microprocessor can also activate container release mechanism 35, FIG. 12, thereby lowering container into water or alternately user may lower container manually and switch multifunction switch 55 to "Brew". At this time, a timer internal to processor 47 will begin counting down from set time and processor 47 will output time remaining to display 51. Also at this time, the processor 47 will command heater controller 40 to reduce wattage further thereby slowly lowering the temperature of the water until it reaches a keep warm temperature suitable for consumption and then maintain that temperature. This temperature has a factory default setting in the processor 47 and can be changed by the user by pressing a combination of buttons. When time reaches "00" the processor will activate LED 60 indicating brew is done and momentarily or periodically activate audible signal device 61. If at any time the steam detector 49 or thermal sensor 27 outputs to processor 47 an electrical signal indicating the presence of steam, the processor 47 will reduce the maximum temperature set point, and thereby reducing water temperature in the future so that no steam is detected. Because this condition may occur at higher altitude locations, this lowered setting will be stored by processor 47 and used for future settings.

The processor 47 also analyzes the rate of rise from the temperature sensor 27 and can determine the point of boiling by sensing a significant decrease in the rate of temperature rise, and will likewise reduce settings appropriately. If the user attempts to increment set temperature above this stored temperature, the display 51 will display "Boil". Pressing a combination of buttons and holding for 3 seconds can restore all factory default settings. If kettle is left unattended with no user input for an extended period such as for 2 hours, processor 47 will deactivate heater controller 40 thereby turning off heater. Any user input will restore normal use.

If kettle is operated with no water, processor 47 will determine from sensor 27 that temperature is above normal operation and will deactivate heater. In the event of any component failure which would result in excess temperature of heater 19, boil dry safety switch 50 will interrupt AC power to heater controller 40 thereby deactivating heater 19 until temperature restores to normal.

Figure 12:
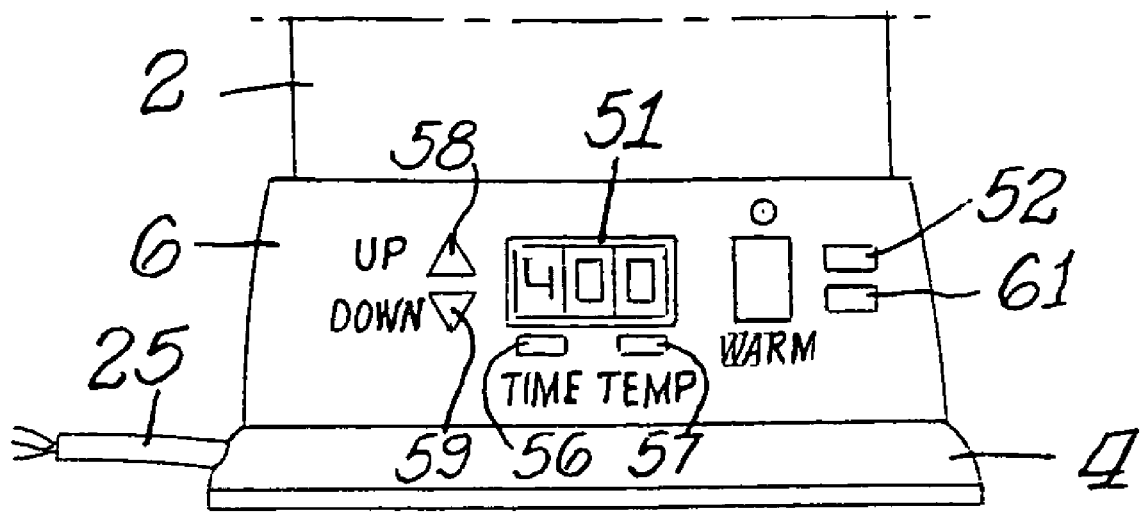
FIG. 12 is a side elevational view of a portion of the apparatus shown in FIGS. 1-5.

One physical layout of the controls and displays is shown in FIG. 12. As shown in FIG. 1, the controls are in part on the handle of the kettle for convenience and the balance are on the base enclosure 6.

In normal use the user preferably preprograms his preferred brewing time and temperature. The processor remembers these settings. In any event the user first programs time and temperature, fills the kettle with water to the desired level and places the correct quantity of coffee or tea inside the brewing container. He will likely not want to immerse the container but rather holds it above the water level while the water heats up to the set temperature level. When that temperature is reached the processor and controller maintain the water in the kettle at the set temperature until the user is ready to start the brewing process. When the user wishes, he then actuates a brewing switch button and lowers the container with the coffee or tea below the water surface to allow the extraction process to begin. Power to the heater is normally turned off at the beginning of the brewing cycle, but as explained later the heating may continue for a limited time. The timer starts counting down and at the end of the preset brewing time an audible alarm and/or light indicates that the brewing time has ended. The user then will likely want to raise the container above the liquid level or remove it completely from the water kettle. The beverage is then ready to serve.

Because of the flexibility provided the user can select the optimum time and temperature for brewing. He can elect to either place the container with tea and coffee into the kettle above the water during the heat-up and steaming period to allow the tea or coffee to bloom or he can elect to place the tea and coffee in the container only after the water is at temperature and ready to brew. The user can adjust the amount of tea and coffee used and this novel means allows the user to adjust the effective open-area of the container walls and thereby affect the flow of water in and out of the container during the brewing cycle. During the brewing cycle the user can increase the flow through the container simply by alternately raising and lowering the container within the liquid or in and out of the liquid as the brewing proceeds.

If the user wishes to brew at any set temperature but particularly at a temperature at or very close to the local boiling point of water, the processor will direct the controller to apply full or virtually full power to the heater in order to heat the water quickly to that set temperature. Just before the temperature reaches the set temperature the processor will normally direct the controller system to reduce power to a lower level in order to either reduce the opportunity for boiling or to approach the set temperature more slowly and with greater temperature accuracy, thus avoiding temperature overshoot. This insures rapid heat-up and temperature accuracy. If, however the user sets the temperature above the local boiling temperature, a boiling detector or temperature sensor located at the top of the kettle in the steam zone, in the liquid, or otherwise in close thermal contact with the liquid and/or steam alerts the processor to read and record the temperature at which the boiling occurred. Then in the subsequent use the processor and display alerts the user that his setting is above the boiling point and prevents him from setting the temperature above the boiling point. The boiling detector can be, for example a thermistor that senses a leveling off of the rise of liquid temperature of the steam/air mixture, a moisture sensitive resistor or, for example, a thermally sensitive switch based on a thermally sensitive bimetallic material appropriately located to detect the liquid or steam temperature. To sense the leveling of the liquid or vapor temperature rise and hence boiling during the heating cycle one can use an electronic processor that analyzes the rate of rise of the liquid or steam/air and senses the moment that the temperature no longer rises.

Electronic means can be incorporated to detect power failures and to switch off the power and to alert the user to restart the unit when power is restored. Any of a variety of audible and/or visual alarms can be used to alert the user to the fact that the water is still heating, that the water temperature is ready to start brewing, or that the brewing cycle is complete.

Figure 13:
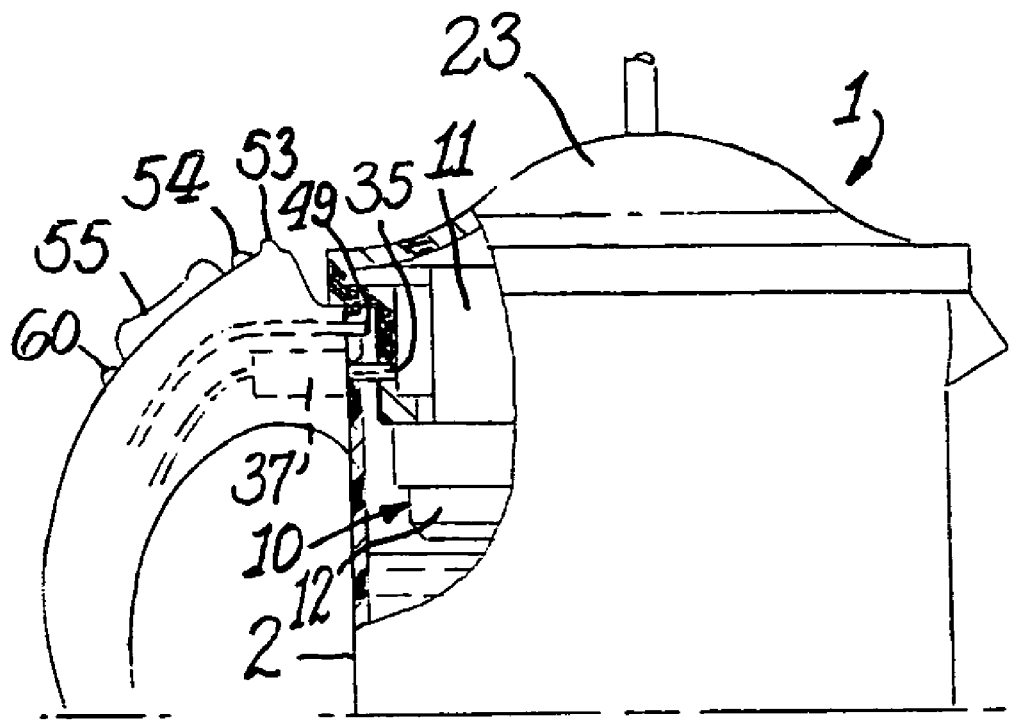
FIG. 13 is a side elevational view partly in section of a portion of the apparatus shown in FIGS. 1-5.

An automated version of this improved brewing means incorporates an electrically actuated "holder" of the container that holds the loaded container above the water level until the water is at the desired brewing temperature. At that temperature the electronic processor directs the electrically actuated holder to release the basket and allows it to drop and immerse into the liquid appropriately. The brewing timer alerts the user when the brewing time is complete to advise him that it is time to raise the container above the liquid, and if desired to remove the container reflecting the fact that the beverage is ready to pour. The electrically actuated "holder" can be an electromagnetically actuated solenoid 37 that moves a rod or lever 35, FIG. 13 to hold and subsequently release the container. Alternatively an electromagnet can be used to attract and hold to it a metal ferromagnetic structural part of the container.

FIGS. 15-16 show further embodiments of this invention which are intended to maintain the liquid contents at their desired temperature. As shown in FIG. 15 the kettle 1A includes an outer jacket 80 completely around the vessel 2. The space 82 between the jacket 80 and the vessel 2 is evacuated so as to provide an insulation around the vessel 2.

FIG. 16 shows a variation where the kettle 1B has a foam jacket or sleeve 84 disposed around and against the shell vessel 2. The foam sleeve includes electrical wiring 86 which would be connected by wires 88 to processor 47 for heating the sleeve 84 and thereby maintaining the temperature of the liquid within vessel 2. Sleeve 84 could be permanently mounted around vessel 2. Alternatively, the insulation to maintain the temperature of the liquid in vessel 2 could be achieved wherein a sleeve such as sleeve 84 is made of a heat retaining material as is generally known and could be permanently or detachably mounted around vessel 2 without the provision of electrical wiring 86 for heating the sleeve.

An important advantage of this new brewing kettle, is that the processor can be programmed to either hold the temperature at the set temperature for a predetermined portion of the brewing time, to heat only until the temperature equilibrates, or to heat for the entire brewing cycle. The actual brewing temperature generally will drop slightly when the container is immersed in the heated water. Clearly it is preferable in any event to use less than full heater power for any heating once the brewing begins in order to avoid any possible overheating of the liquid and the extracted flavorants. By holding the temperature relatively constant during the brewing cycle, the extraction process is optimized, the time can be reduced, and the flavor enhanced. Flavorants, however can be oxidized by direct contact with the heater plate and hence the heater plate must not be excessively hotter than the brewing water.

By designing the advanced electric brewing kettle described here with a circular wall configuration it is possible for this advanced brewing means to be used with a separate close fitting flexible screen like those used in a french press that can be alternatively attached to control rod 15 where the coffee/tea container 10 is normally attached By this means the versatility of the product is increased and the need for a separate french press is eliminated for the average household.

What is claimed is:

1. An electrically heated liquid kettle comprising a vessel for holding a liquid for extraction of tea, coffee, or other food material, said vessel including a partially open immersible container sized to allow passage of liquid between the walls of said vessel, said container being capable of holding the material while providing an opening in said container to allow entrance of liquid therein upon immersion of said container in liquid, said heated kettle incorporating structure to hold said container out of the liquid until the liquid reaches appropriate extraction temperature and to immerse or withdraw said container into or from liquid as necessary to accomplish the extraction, where said structure to hold said container is an electromagnet, and said container including a ferromagnetic structured element attracted and held by a magnetic field of said electromagnet.

2. An electrically heated liquid kettle comprising a vessel for holding a liquid for extraction of tea, coffee, or other food material, said vessel including a partially open immersible container sized to allow passage of liquid between the walls of said vessel, said container being capable of holding the material while providing an opening in said container to allow entrance of liquid therein upon immersion of said container in liquid, said heated kettle incorporating structure to hold said container out of the liquid until the liquid reaches appropriate extraction temperature and to immerse or withdraw said container into or from liquid as necessary to accomplish the extraction, said opening to allow entrance of liquid at least in part being a meshed screen, and an adjustable shutter adjacent said screen to permit the adjustment of the effective area of the entrance of liquid.

3. An electrically powered heated kettle comprising a lidded but unsealed vessel for holding a vaporizable liquid, a heater capable of heating the liquid in said vessel to the boiling point of the liquid at the prevailing atmospheric pressure, an electrical control to preset the desired temperature of the liquid, an electrical signal processor directed by said electrical control to direct a controller of the flow of electrical power to said heater, an electrical sensor to generate an electrical signal proportioned to the temperature of the liquid or the air/vapor mixture directly above the liquid in said vessel as the liquid is heated by said heater to the boiling point, and to transmit said signal to said electrical processor, whereby said processor can determine therefrom when the liquid is boiling, to determine and store the exact value of temperature of said boiling point and to prevent the subsequent adjustment of said set desired temperature to any value above said boiling temperature as established by said processor.

4. An electrically heated liquid kettle comprising a vessel for holding liquid for extraction of tea, coffee, or other food material, said vessel including an immersible container designed to hold the food material, sized to allow passage of liquid around said container and constructed with multiple adjustable openings to control the rate of liquid flow into and out of said container upon immersion of said container into the liquid, and said heated kettle incorporating structure to hold said container out of the liquid until the liquid reaches appropriate extraction temperature and to immerse into or withdraw container from the liquid as necessary to accomplish said extraction.

5. An electrically heated kettle comprising a vessel for holding liquid for extraction of tea, coffee, or other food material, an immersible container with multiple adjustable openings designed to hold the food material and to allow flow of liquids or its vapors into and out of said container through said openings and said kettle incorporating a holding structure to hold said container in the vapor space in order to allow the food material to absorb the vapors of the heated liquid until the liquid in said kettle reaches appropriate extraction temperature and to permit immersion into and withdrawal from the heated liquid to accomplish said extraction.

6. An electrically heated kettle for holding liquid for the extraction of coffee, tea, or other food material comprising an immersible container with adjustable openings designed to hold the food material and to allow flow of liquids or its vapors into and out of said container thru said openings, an electric heater, a user control panel, and an electrical controller and an electrical processor to direct said electrical controller to heat the extracting liquid to a temperature programmable by the user on said control panel and to actuate an audible or light announcing when the liquid has reached the pre-selected temperature and to hold the liquid at that temperature until the user by way of said control panel directs the processor to initiate a brewing cycle.

7. An electrically heated kettle for holding liquid for the extraction of coffee, tea or other food material according to claim 6 containing structure to hold said container in the vapor space in order to allow the food material to absorb vapors of the heated liquid while the liquid is being heated.

8. An electrically heated kettle for holding liquid for the extraction of coffee, tea, or other food material according to claim 7 where said control panel provides a switch that when actuated causes the processor to automatically release said container into the liquid when it reaches the programmed brewing temperature.

9. An electrically heated kettle for holding liquid for the extraction of coffee, tea, or other food material according to claim 6 where said electrical controller includes an electrical relay to apply full power to the heater, and a zero-crossing driver with a triac that is activated and de-activated many times each second in a time based pulse-width modulation manner to permit the application of either full power to said heater or to reduce the effective power to the heater to only that level sufficient to maintain the liquid at the programmed brewing temperature.

10. An electrically heated kettle for holding liquid for the extraction of coffee, tea or other food material according to claim 6 where said user control panel comprises user actuated switches to select the temperature for brewing the food material, and the brewing time and the keep-warm temperature after brewing with visual or audible indicators or when the liquid reaches the brewing temperature and when the brewing time is completed.

11. An electrically heated kettle for holding liquid for the extraction of coffee, tea or other food material according to claim 6 where said container is manually removable from the liquid.

12. An electrically heated kettle for holding liquid for extraction of coffee, tea or other food material comprising an electrical heater, an electrical thermal detector responsive to the temperature of the liquid or its vapor, an electrical processor, and an associated data storage device to accept and store in said data storage device the electrical signal created by said detector while the liquid is being heated and to calculate the rate of rise of that electrical signal and to store the value of that electrical signal at the instant in time that the rate of temperature rise goes to zero, so that the value of signal can be utilized by said processor to anticipate the beginning of boiling at the local atmospheric pressure and to reduce the electrical power applied to the heater to prevent continuous boiling of the liquid.

13. An electrically heated kettle for holding liquid for the extraction of coffee, tea or other food material according to claim 1 where said container is manually removable from the liquid.

14. An electrically heated kettle for holding liquid for the extraction of coffee, tea or other food material according to claim 2 where said container is manually removable from the liquid.

* * * * *